Sept. 19, 1961　　　F. G. WILLARD ET AL　　　3,000,517
WORKPIECE POSITION CONTROL APPARATUS
Filed June 5, 1959　　　　　　　　　　　　　　6 Sheets-Sheet 1

WITNESSES:
Bernard R. Gieguey
James F. Young

INVENTORS
Henry A. Pahl and
Frank G. Willard.
BY R.S.Brodahl
ATTORNEY

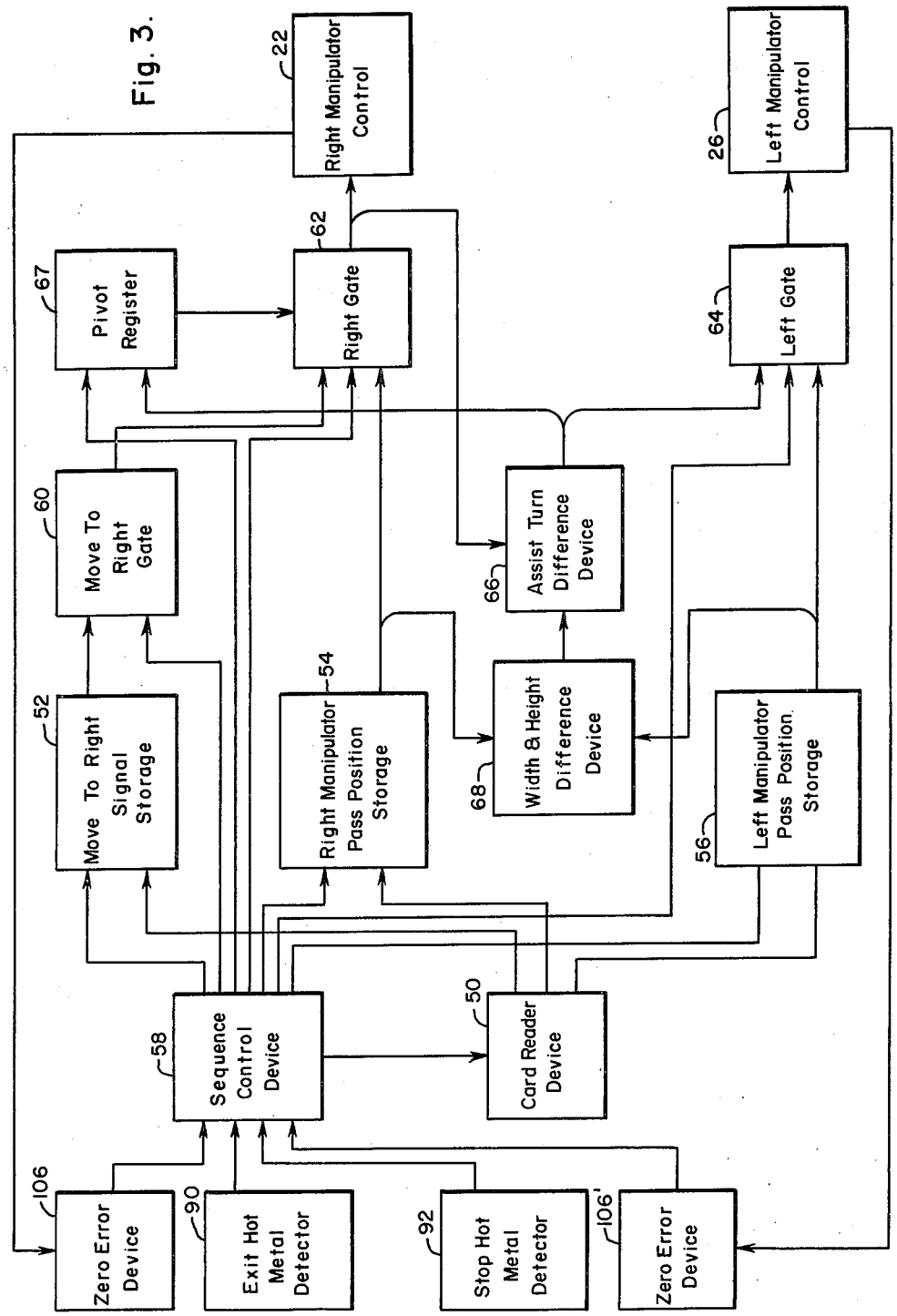

3,000,517
WORKPIECE POSITION CONTROL APPARATUS
Frank G. Willard, Clarence, N.Y., and Henry A. Pahl, Evergreen Park, Ill., assignors to Westinghouse Electric Corporation, East Pittsburgh, Pa., a corporation of Pennsylvania
Filed June 5, 1959, Ser. No. 818,454
13 Claims. (Cl. 214—1)

The present invention relates to workpiece position control apparatus and more particularly to automatic control apparatus for positioning a workpiece, such as a metal billet member and operative with a steel rolling mill.

It is an object of the present invention to provide improved workpiece positioning apparatus operative to automatically and better control the positioning of a workpiece through a predetermined sequence program of different workpiece positions.

It is another object of the present invention to provide improved steel mill workpiece, such as for example a billet, manipulator control apparatus wherein the workpiece or billet manipulation schedule is automatically controlled in accordance with a predetermined program, including predetermined workpiece positions and a predetermined scheduling of those positions.

It is a different object of the present invention to provide improved workpiece manipulator control apparatus operative to provide a predetermined initial spacing between the location of the right and left manipulator members, and then provide a predetermined subsequent spacing between the manipulator members and a subsequent location of these manipulator members.

It is an additional object of the present invention to provide improved workpiece manipulator member control apparatus operative to automatically and better control the relative spacing as well as the relative positions of a pair of manipulator members operative with a workpiece, such as for example a metallic billet, to be positioned.

These and other objects and advantages of the present invention will become apparent in view of the following description, taken in conjunction with the drawings, wherein:

FIG. 3 is a diagrammatic showing of the control apparatus in accordance with the present invention;

Figure 1:
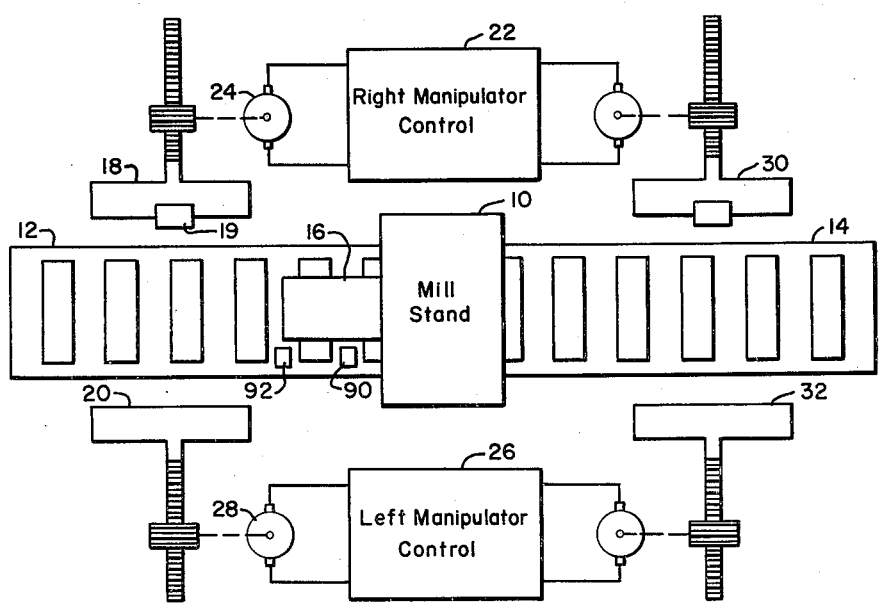
FIG. 1 is an illustrative showing of a metallic billet rolling mill including left and right manipulator position control members.

In FIG. 1 there is shown a mill stand 10 including a rear table 12 and a front table 14. A metal workpiece such as a billet 16 is shown traveling out of the mill stand 10 on to the rear table 12. A right manipulator member 18 and a left manipulator member 20 are operative to move inwardly and position the billet 16 on the rear table 12 prior to and in preparation for reentry into the mill stand 10. A right manipulator control 22 is operative with a motor 24 for controlling the movement of the right manipulator member 18 relative to the rear table 12. Similarly, a left manipulator control 26 is operative with a motor 28 for controlling the movement of the left manipulator 20 relative to the rear table 12. The front table 14 similarly includes a right manipulator member 30 and a left manipulator member 32 that are respectively operative with the controls 24 and 26.

Figure 2:
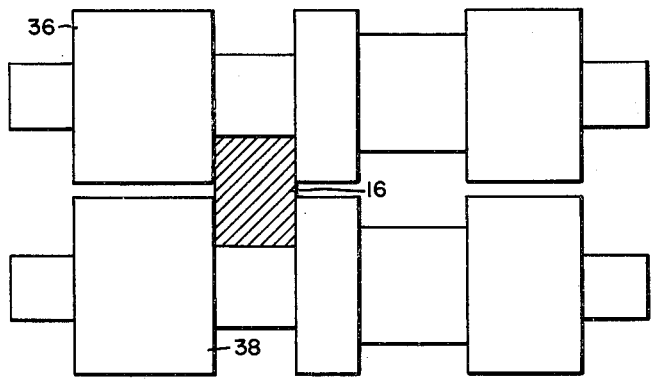
FIG. 2 is an illustrative showing of a roller member for the rolling mill stand shown in FIG. 1.

In FIG. 2 there is shown the upper roller member 36 and a lower roller member 38 operative with the billet 16 positioned therebetween to illustrate one type of mill stand 10 shown in FIG. 1, for which the present control apparatus is contemplated.

In FIG. 3 there is shown a card-reader device 50 which is a well known and conventional type of card-reader device readily available on the open market at the present time. A sequence control device, which may comprise a well-known asynchronous clock sequence control device 58, is operative to provide sequence controlling signals to the various control apparatus devices for controlling the operation of those devices.

Figure 4A:
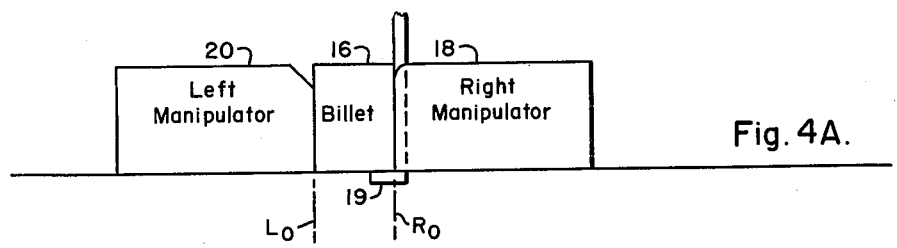
FIGS. 4A, 4B, 4C, 4D and 4E are an illustrative showing of the left and right manipulator members positioned relative to a workpiece or billet to be handled thereby.

The card-reader device 50 is operative to supply to the right manipulator pass position storage device an initial position control signal $SR_0$ for controlling the initial position $R_0$ of the right manipulator member 18 as shown in FIG. 4A. When the sequence control device 58 sends a control signal to the right manipulator pass position storage device 54, the initial position control signal $SR_0$ is supplied through the right gate 62 as also sequenced by the sequence control device 58 to the right manipulator control 22 for causing the right manipulator member 18 to assume a first position $R_0$. Similarly, the card-reader 50 supplies an initial left manipulator position control signal $SL_0$ to the left manipulator passage position storage device 56, and the sequence control device 58 supplies a command signal to the left manipulator pass position storage device 56 causing this initial position control signal $SL_0$ to pass through the left gate device 64 as sequenced by a suitable signal from the sequence control device 58 to the left manipulator control 26 for causing the left manipulator member 20 to assume the desired initial position $L_0$.

In the normal operation of the present control apparatus, when there is sufficient room on the work table to turn over the billet with the right manipulator member 18 in its position $R_0$, only the left manipulator member 20 is moved to the left and then the fingers 19 of the right manipulator member 18 turns over the billet 16. However, when it has been predetermined that due to the size of the billet 16 or for some other reason there is not enough room on the work table to turn over the billet 16, then the card-reader device 50 supplies a control signal to the move-to-right signal storage device 52 such that an arbitrary and preselected position control signal $SR_1$ is supplied to the right manipulator control 22 for causing the right manipulator member to move to some preselected position $R_1$. Whenever this move-to-right positioning operation is desired, this preselected position $R_1$ is always the same. One suitable way of providing this preselected position control signal $SR_1$ is to prewire or predesign it into the structure of the right gate 62 as will be later described. When the right manipulator member 18 moves to this preselected position $R_1$, the left manipulator member 20 will move to a position $L_1$ due to a signal differencing operation that will be later described in greater detail.

When the latter move to the right is desired, control signal $SR_1$ is also supplied to the assist turn difference device 66 from the right gate 62. Simultaneously, the sequence control device 58 causes the right manipulator pass position storage device 54 to supply to the width and height difference device 68 the initial position control signal $SR_0$ for the right manipulator member 18, and causes the left manipulator position storage device 56 to supply the initial position control signal $SL_0$ of the left manipulator member 20 to the width and height difference device 68. The width and height difference device 68 may comprise a digital difference device in accordance with the teachings of copending patent applications, Serial No. 703,418, filed December 17, 1957, and Serial No. 703,419, filed December 17, 1957, now Patent No. 2,953,773, and assigned to the same assignee as is the present application.

Figure 4B:
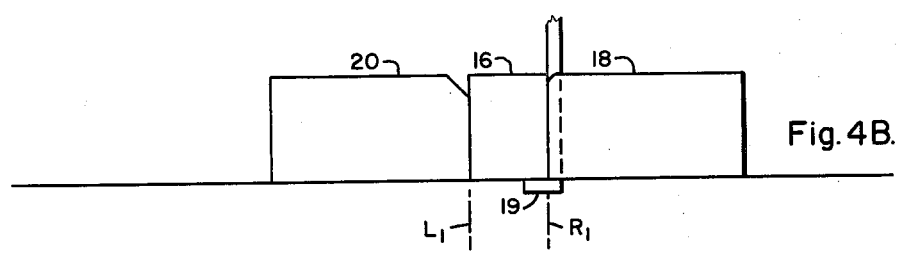

The width and height difference device 68 supplies to the assist turn difference device 66 a control signal corresponding to the difference $(SR_0-SL_0)$ of the initial position control signal $SR_0$ of the right manipulator member 18 minus the initial position control signal $SL_0$ of the left manipulator member 20. The assist turn difference device 66 then provides an output signal $SL_1$ corresponding to the signal $SR_1$ minus the quantity $(SR_0-SL_0)$. This control signal $SL_1$ is supplied through the left gate device 64 to the left manipulator control 26 for causing the left manipulator control member 20 to assume the desired pre-turn position $L_1$ as shown in FIG. 4B and as previously mentioned.

The latter control signal $SL_1$ is also now supplied to the pivot register 67 as determined by the sequence control device 58 and there it is stored.

The card-reader device 50 as controlled by the sequence control device 58 then supplies to the right manipulator pass position storage device 54 the final position control signal $SR_F$ for the right manipulator member 18 and supplies to the left manipulator pass position storage device 56 the final position control signal $SL_F$ for the left manipulator control member 20.

Figure 4C:
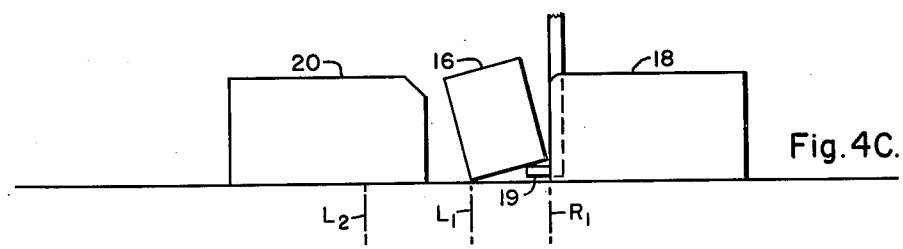
Figure 4D:
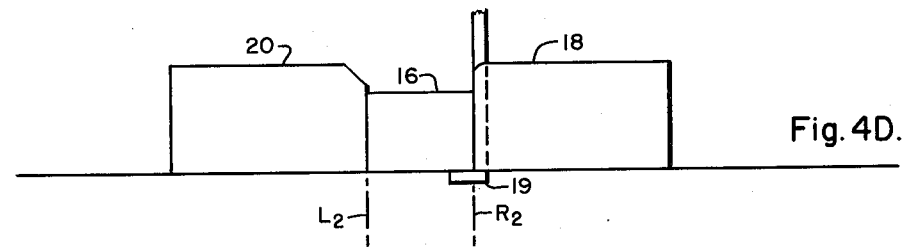

In determining the next position $L_2$ for the left manipulator member 20 as shown in FIGS. 4C and 4D, the right manipulator pass position storage device 54 supplies to the width and height difference device 58 the desired final position control signal $SR_F$ for the right manipulator member 18, and the left manipulator pass position storage device 56 supplies to the width and height difference device 68 the final desired position control signal $SL_F$ for the left manipulator member 20. The width and height difference device 68 determines the difference $(SR_F-SL_F)$ between the latter final position control signals, and supplies this difference signal to the assist turn difference device 66. The control signal $SL_1$ which had been previously stored in the pivot register 67 is then supplied from the pivot register 66 through the right gate 62 to the assist turn difference device 66. The position $R_2$ for the right manipulator member 18 corresponds to the position $L_2$ for the left manipulator member 20, so the latter signal can now be considered as $SR_2$. The assist turn difference device 66 then determines the new position $L_2$ for the left manipulator member 20, in accordance with the relationship $L_2=L_1-(R_F-L_F)$. The control signal $SL_2$ is supplied through the left gate 64 to the left manipulator control 26 for causing the left manipulator member 20 to move to the desired post-turn position $L_2$. If the position $R_0$ was the same as position $R_1$, then position $L_1$ is the same as position $L_0$ in this regard for determining the position $L_2$.

If desired, the left manipulator member 20 can move completely to the position $L_2$ before the right manipulator member 18 leaves the position $R_1$. However, it appears to be more desirable if the right manipulator $R_1$ begins to move in a direction toward the position $R_2$, and at the same time the fingers 19, shown in FIG. 1, are lifted to turn the billet member 16 about a pivot point corresponding to the position $L_1$ of the left manipulator member 20 before the left manipulator member 20 reaches the position $L_2$. This can be controlled by causing the left manipulator member 20 to provide a control signal when it is in the order of six inches short of the position $L_2$, and this latter control signal starts the right manipulator member 18 moving from position $R_1$ toward position $R_2$.

Figure 10:
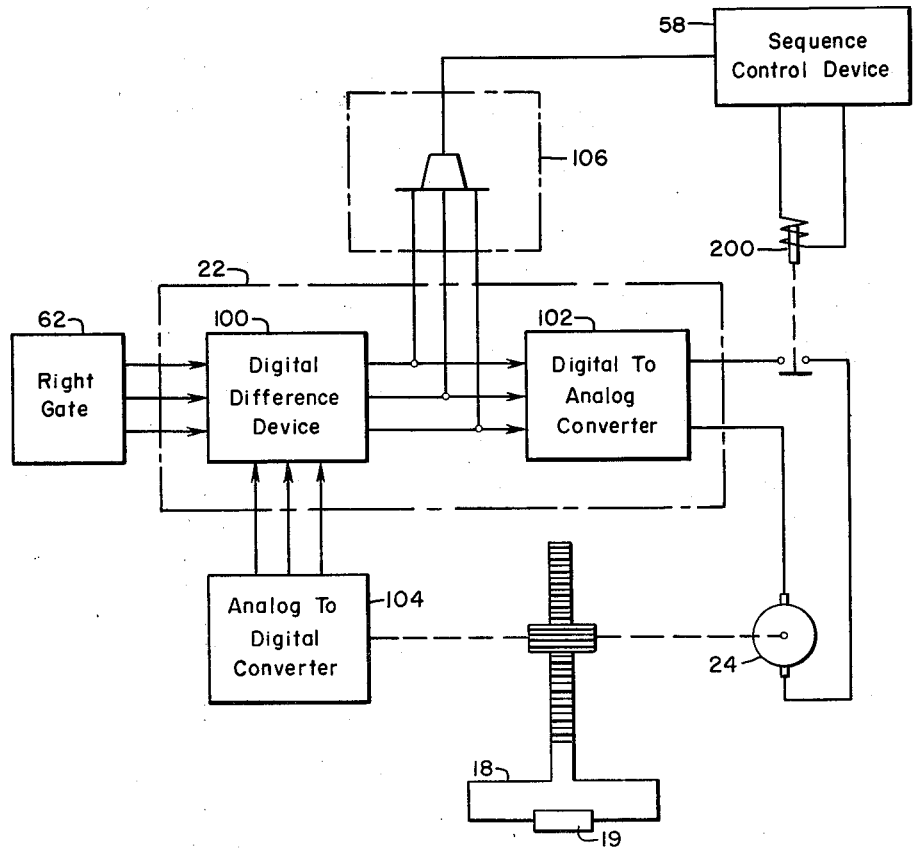
FIG. 10 is a schematic showing of one of the manipulator controls as shown in FIG. 1.

The actual movement of each manipulator member can be controlled by a relay device 200 connected as shown in FIG. 10 in series with the motor for the respective manipulator member. This normally open relay device 200 is closed by the latter control signal through the sequence control device 58 such that the starting of the right manipulator motor 24 can in this manner be controlled as desired. It should be here noted that a suitable signal sensing device can be provided as well known in this art to be operative with the output signal of the digital difference device 100 shown in FIG. 10 as provided for the right manipulator motor 24 and responsive to this output signal when a position difference of six inches or the like exists between the actual position of the right manipulator member 18 and the desired or reference position of the right manipulator member.

The finger members 19 can similarly be controlled to begin their upward motion in combination with the movement of the right manipulator member 18 to thereby provide an arc path for the finger members 19. When the billet member 16 is turned, it will rest against the left manipulator member 20 in its position $L_2$ with the right manipulator member 18 in its position $R_2$ snugly against the opposite end of the billet member 16.

If desired, the billet 16 can be made to fall on the upper part of the left manipulator member 20 and then slide down the side of the left manipulator member 20 to catch the billet 16 as it is turning and prevent it from slamming too hard onto the work table where the turn is being made. Depending upon the size and the shape of the billet 16 any desired one of a plurality of position sensing gates provided to be operative with the output of the digital difference device 100 for the left manipulator motor 28 and each sensitive to a different output of the difference device 100 and selected by the card-reader device 50, could be made to control the relay device 200 for the right manipulator motor 24 to start the right manipulator member 18 moving toward its position $R_2$.

Now the sequence control device 58 causes the right manipulator pass position storage device 54 to supply the final position control signal $SR_F$ through the right gate 62 to the right manipulator control 22 for causing the right manipulator member 18 to move to its final position $R_F$. Simultaneously, the left manipulator pass position storage device 56 supplies the final position control signal $SL_F$ through the left gate 64 to the left manipulator control 26 for causing the left manipulator member 20 to move to its final position $L_F$.

Figure 4E:
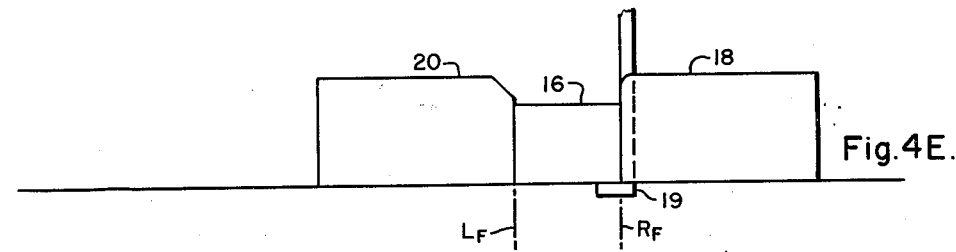

In FIGS. 4A through 4E the sequenced relative positions of the left manipulator member 20 and the right manipulator member 18 are shown relative to the billet 16. The finger member 19 is carried by the right manipulator member 18. In FIG. 4A, the billet 16 is shown in its initial position as it leaves the mill stand 10. The right manipulator member 18 is shown in its position $R_0$ and the left manipulator member 20 is shown in its position $L_0$. When desired to provide more turning space, the left manipulator member 20 and the right manipulator member 18 can be moved to the respective positions $L_1$ and $R_1$ as shown in FIG. 4B. Then, as shown in FIG. 4C, the left manipulator member 20 is moved in a direction toward position $L_2$ and the finger members 19 are raised and the right manipulator member 18 begins its movement from its position $R_1$ to the position $R_2$, which corresponds to the position $L_1$, and which latter position $R_2$ is the pivot point for the billet 16. In FIG. 4D, the left manipulator member 20 is shown in its position $L_2$ and the right manipulator member 18 is shown in its position $R_2$, with the finger members 19 returned to the original position as shown in FIGS. 4A and 4B. In FIG. 4E, the left manipulator member 20 and the right manipulator member 18 have moved to their respective positions $L_F$ and $R_F$, where the billet 16 is now ready to again enter the mill.

Figure 5:
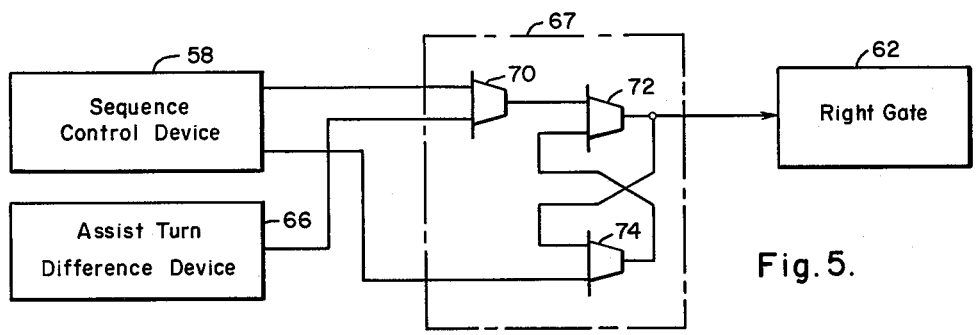
FIG. 5 is a schematic showing of the pivot register shown in FIG. 3.

In FIG. 5 there is shown a schematic circuit arrangement for one digit of the pivot register 67, showing a first NOR element 70 operative to receive the command signal from the sequence control device 58 and the control signal $SL_1$ from the assist turn difference device 66. In this regard the operation of the NOR element 70 is believed to be well known and conventional to persons skilled in the present art. The NOR element is operative to provide an output signal when neither of its inputs is energized. Thusly, the control signal $SL_1$ as well as the command signal from the sequence control device 58 will consist of the absence of signals. The output signal from the NOR element 70 is supplied to a first NOR element 72 in a flip-flop circuit including a second NOR element 74, and causes an output signal similarly in the form of the absence of a signal to be supplied to the corresponding digit of the right gate 62, which output signal is the control signal $SL_1$ supplied by the assist turn difference device 66.

Figure 6:
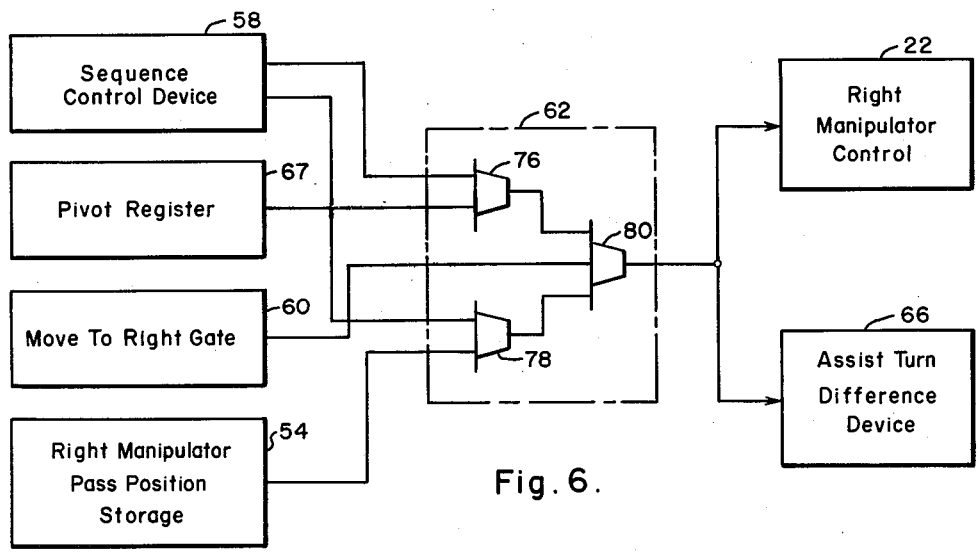
FIG. 6 is a schematic showing of the right gate element shown in FIG. 3.

In FIG. 6 there is shown a schematic arrangement for one digit of the right gate 62, including a first NOR element 76 operative to receive a command signal from the sequence control device 58, and the control signal $SL_1$ from the pivot register 66. A second NOR element 78 is operative to receive a control signal from the right manipulator pass position storage device 54 and a command signal from the sequence control device 58. The move-to-right gate 60 supplies the override control signal to the NOR element 80 when it is desired to move the billet for turning and it is desired that this particular digit of the control signal $SR_1$ has a zero value. This override signal could be supplied to the NOR element 78 if it is desired that this digit of the control signal $SR_1$ has a one value. The signal from the right gate 62 is supplied to the right manipulator control 22 and the assist turn difference device 66, as shown in FIG. 3. When a signal is provided from the move-to-right gate 60 in this regard, the arbitrary position $R_1$ is determined for each digit by the connection for the respective digit being made to the NOR element 80 as shown in FIG. 6. When a zero value is desired for that particular digit, or instead this connection is made to the NOR element 78 when a one value is desired for that particular digit. In this manner the arbitrary position $R_1$ is preselected by the respective values of the digits of the output plural digit coded signal from the right gate 62.

Figure 7:
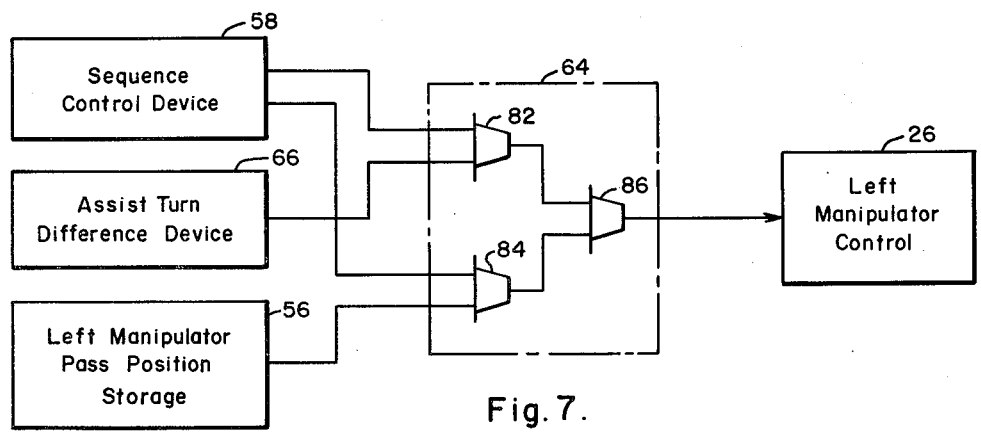
FIG. 7 is a schematic showing of the left gate element shown in FIG. 3.

In FIG. 7, there is shown a schematic arrangement for one digit of the left gate 64, and including a first NOR element 82 which receives a command signal from the sequence control device 58 and a control signal from the assist turn difference device 66. A second NOR element 84 is provided which receives a command signal from the sequence control device 58 and a control signal from the left manipulator pass position storage device 56. The output of the NOR element 86 is supplied to a left manipulator control 26, as shown in FIG. 3.

Figure 8:
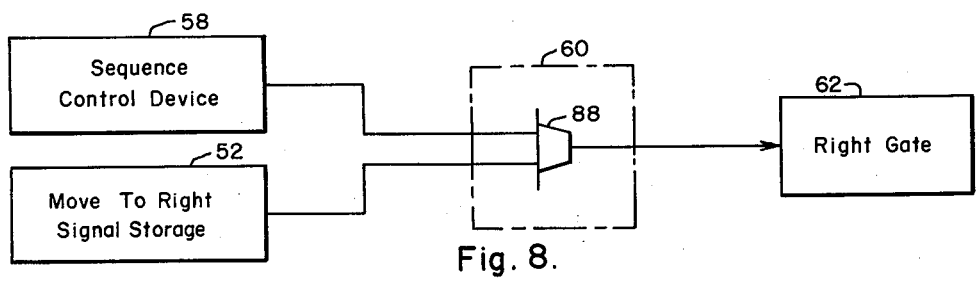
FIG. 8 is a schematic showing of the move-to-right gate element shown in FIG. 3.

In FIG. 8, there is shown a schematic arrangement of the complete circuit for the move-to-right gate 60 which may comprise a single NOR element 88, having applied to its input the command signal from the sequence control device 58 and the control signal from the move-to-right signal storage 52. The output of the NOR element 88 is supplied to the respective digits of the right gate 62.

In FIG. 1, there is shown an exit hot metal detector device 90 and a stop hot metal detector device 92 for controlling the billet positioning operation by the manipulator members 18 and 20. When the billet member 16 has left the mill stand 10 such that the front section of the billet member 16 is adjacent the exit hot metal detector 90, a control signal is supplied to the sequence control device 58 as shown in FIG. 3 and which in turn supplies a signal to the pivot register 67 that causes a reset of the pivot register 67. When the billet member 16 has moved to a position between the right manipulator member 18 and the left manipulator member 20 and such that its rear portion is adjacent to or has passed beyond the stop hot metal detector 92, a control signal is supplied to the sequence control device 58 as shown in FIG. 3 and which in turn supplies a signal that causes the left gate 64 to close relative to the signal $SL_0$, causes the move-to-right gate 60 to open, causes the left gate 64 and the right gate 62 to open relative to the signal $SR_1$ and after a predetermined time delay in the order of 1/1000 of a second or so causes the pivot register 67 to store the signal $SL_1$ from the assist turn difference device 66.

The right manipulator control 22 and the left manipulator control 26 each includes a zero error circuit 106 as shown in FIG. 10, operative to provide an output control signal to the sequence control device 58 to indicate that the respective right manipulator member 18 and the left manipulator 20 are actually in the desired or reference positions.

More specifically as shown in FIG. 10, the right manipulator control 22 is diagrammatically illustrated and includes a digital difference device 100 which may comprise the control device set forth in the previously mentioned copending application Serial No. 703,418, filed December 17, 1957. The control signal from the right gate 62 including as many digits as desired, with three such digits being illustrated in FIG. 10, is supplied to one input of the digital difference device 100. The output or position error signal from the digital difference device is supplied to a digital to analog converter 102 which controls the operation of the motor 24 when the relay 200 is closed by the sequence control device 58 for positioning the right manipulator member 18. The actual position of the right manipulator member 18 is converted into a parallel numerically coded signal by an analog to digital converter 104 and is supplied to a second input of the digital difference device 100, such that the digital difference device 100 supplies an output position error signal in accordance with the difference between the parallel numerically coded signal supplied as a reference signal by the right gate 62 and the parallel numerically coded actual position control signal supplied by the analog to digital converter 104. When the output signal from the digital difference device 100 is zero, all of the inputs of the NOR device 106 are not energized such that it provides an output control signal to the sequence control device 58, and indicates that the right manipulator member 18 is actually in the position that it is desired to be in. The output control signal from the zero error circuit 106 for the right manipulator control 22 is operative to close the move-to-right gate 52, to close through the sequence control device the right gate 62, to close the pivot register 66 to prevent further changes in its stored information and to open the right gate 62. The billet member 16 is now in the position shown in FIG. 4D. The output signals from the zero error circuits of each of the left manipulator control 26 and right manipulator control 22 causes the sequence control device 58 through an AND device within the sequence control device 58 to initiate the movement of the right manipulator member 18 and left manipulator member 20 to the position shown in FIG. 4E. In this regard, this allows the final position control signal $SR_F$ for the right manipulator member 18 to pass through the right gate 62 and the final position control signal $SL_F$ for the left manipulator member 20 to pass through the left gate 64. When the respective manipulator members 18 and 20 are in the respective positions $R_F$ and $L_F$, the zero error circuits operative with the controls for these respective manipulator members provide output signals indicating that the respective manipulator members are in their desired positions, and this is operative to cause the billet member 16 to reenter the mill stand 10.

Figure 9:
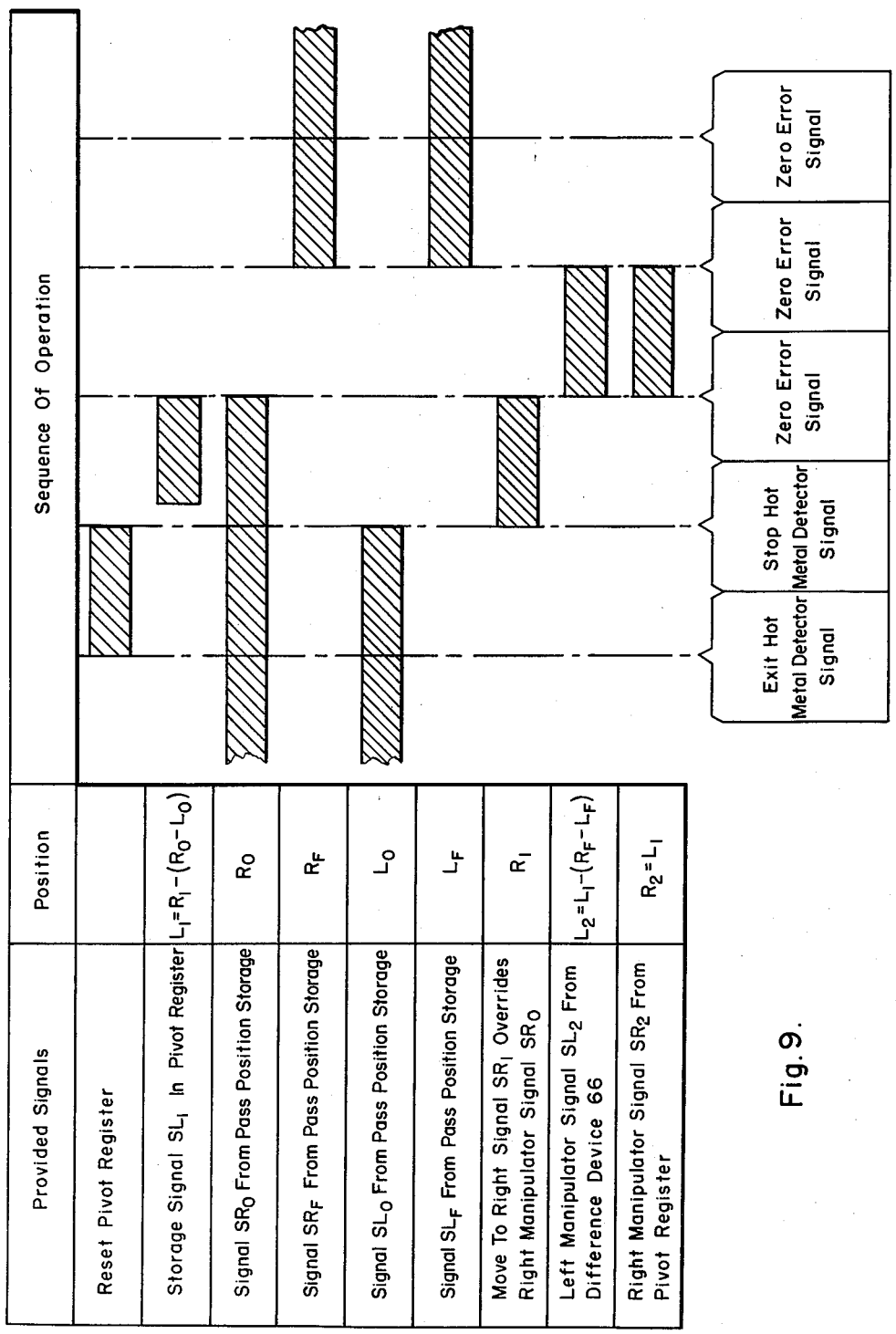
FIG. 9 is a curve chart illustrating the operation of the present control apparatus.

The curve chart shown in FIG. 9 illustrates the provision of the indicated signals as a function of the sequence of operations during the operation of the control apparatus in accordance with the teachings of the present invention. The shaded portions represent the provision of the respective signals. The actual sequential steps or changes are controlled by signals from the hot metal detectors and the zero error devices acting through an AND device within the sequence control device 58 such that a zero error signal is provided when each of the right and left zero error devices indicate a zero error position condition has occurred.

In accordance with the prior art control apparatus for steel mill billet manipulator members, a human operator is required to control the positioning of the manipulator members. The control apparatus in accordance with the present invention is operative to supply fast position reference information to a position regulator and using only programmed pass position information, a computation is made of the reference position of the manipulator members at various stages of the turn when directed by the command circuits from the signal storage devices.

There is shown in particularly FIGS. 4A through 4E, that the left manipulator member is located to the left of the right manipulator member by a distance equal to the width of the workpiece or billet member before the billet member is turned, and is located or spaced by a distance equal to the height of the workpiece or billet member after the billet member is turned. It should also be noted that the left manipulator member 20 as shown in FIGS. 4A through 4E, can if desired, move fully to the position $L_2$ before the right manipulator member 18 leaves the position $R_1$, as shown in FIG. 4B. It should also be noted that instead of the finger member 19, as shown in FIGS. 4A through 4E, a hydraulic pusher device or the like may be operative with the uppermost portion of the billet member 16 for turning the billet about the pivot position $L_1$. However, in actual practice of the present control apparatus and in accordance with the teachings of the present invention, the left manipulator member 20 should preferably provide a control signal from a suitable signal sensing gate circuit when it is in a position about six inches prior to arriving at the position $L_2$, and this latter control signal is operative to start the finger members 19 in an upward direction and to start the right manipulator member 18 moving from the position $R_1$ toward the position $R_2$, thusly providing the desired arc path for the finger members 19.

It should be here noted that the relay devices 200 provided for the respective right manipulator control 22 and the left manipulator control 26 are normally open and are closed by the provision of one of the control signals $SR_0$, $SR_1$, $SR_2$ and $SR_F$ for the control 22 and one of the control signals $SL_0$, $SL_1$, $SL_2$ and $SL_F$ for the control 26.

The respective zero error circuits for the controls 22 and 26 are then operative to control the opening of the respective relay devices for the motors 24 and 28. Further it should be understood that the workpieces to be positioned by the present control apparatus may be blooms or slabs, bars or ingots as well as billets and other suitable shaped workpieces. Further the control signals and circuits employed may be of plural digit coded signals, such as binary and decimal coded signals, and parallel as well as serial coded signals.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In workpiece control apparatus operative with first and second workpiece positioning devices for positioning a workpiece, the combination of a first control device operative with said first workpiece positioning device for providing a first control signal for positioning said first workpiece positioning device to a first predetermined position, a second control device operative with said second workpiece positioning device for providing a second control signal for positioning said second workpiece positioning device to a second position, a position signal storage device operative with one of said first and second control devices for providing a third control signal for positioning one of said workpiece positioning devices to a third position, and a position difference determining device operative with at least said third control signal for providing a fourth control signal to position the other of said workpiece positioning devices to a fourth position in accordance with a predetermined relationship to said third position.

2. In workpiece position control apparatus operative with a control information storage device and first and second workpiece positioning members for positioning a workpiece, the combination of a first control device connected to said first workpiece positioning member and operative with said control information storage device for receiving a first control signal for positioning said first workpiece positioning member to a first predetermined position, a second control device connected to said second workpiece positioning member and operative with said control information storage device for receiving a second control signal for positioning said second workpiece positioning member to a second predetermined position and in accordance with a predetermined relationship between said first position and said second position, a position signal storage device connected to one of said workpiece positioning members and operative with one of said first and second control signals for providing a third control signal for positioning said one workpiece positioning member to a third position and in accordance with a predetermined relationship to one of said first and second positions and a position signal difference device connected to the other of said workpiece positioning members and operative with said third control signal for providing a fourth control signal for positioning the other of said workpiece positioning members to a fourth position.

3. In workpiece control apparatus operative with a workpiece position information storage device and first and second workpiece positioning members for controlling the position of a workpiece, the combination of an operation sequencing control device, a first control device operatively connected to said first positioning member and operative with said information storage device for receiving a first control signal from said storage device for positioning said first workpiece positioning member to a first predetermined position, a second control device operatively connected to said second positioning member and operative with said information storage device for receiving a second control signal from said storage device for positioning said second workpiece positioning member to a second predetermined position and in accordance with a predetermined relationship to said first predetermined position, a position signal storage operatively connected to one of said workpiece positioning members for positioning said one workpiece positioning member to a third predetermined position in accordance with a predetermined relationship to one of said first and second positions, and a position difference determining device operatively connected to the other of said workpiece positioning members for positioning said other workpiece positioning member to a fourth position in accordance with a predetermined relationship to said third position, with said operation sequencing control device being operatively connected to at least said first and second control devices for controlling the operating sequence of said workpiece positioning members by at least said first and second control devices.

4. In workpiece position control apparatus operative with first and second workpiece positioning members for positioning a workpiece, the combination of a first control device operatively connected to said first member for providing a first control signal for positioning said first workpiece positioning member to a first predetermined position, a second control device, operatively connected to said second member for providing a second control signal for positioning said second member to a second position and in accordance with a predetermined relationship to said first predetermined position, a third control device operatively connected to one of said workpiece positioning members for positioning said one member to a third position, a position difference determining device operatively connected to the other of said workpiece positioning members for positioning said other member to a fourth position and an accordance with a predetermined relationship to said third position, and an operation sequence control device operatively connected to at least said first, second and third control devices for sequencing said first and second positions before said third position.

5. In workpiece position control apparatus operative with first and second workpiece position control members for positioning a workpiece, the combination of a first control device operative with said first control member for positioning at least said first control member to a first predetermined position, a second control device operative with said second control member for positioning said second workpiece control member to a second position and in accordance with a predetermined relationship to said first predetermined position, a third control device operative with one of said workpiece control members for positioning said one workpiece control member to a first predetermined location, a position difference determining device operative with the other of said workpiece control members for positioning said other workpiece control member to a second predetermined location and in accordance with a predetermined relationship to said first location, workpiece position sensing means operative to provide a control signal when said one workpiece control member is in said first predetermined location, with said first and second control devices being responsive to said control signal for positioning said first and second workpiece control members to said first and second positions respectively in accordance with a predetermined difference relationship between said first and second positions.

6. In workpiece position control apparatus operative with first and second workpiece positioning members for positioning a workpiece, the combination of a first control device operatively connected to said first member for providing a first control signal for positioning said first workpiece positioning member to a first position, a second control device operatively connected to said second member for providing a second control signal for positioning said second member to a second position and in accordance with a predetermined relationship to said first position, a position storage device operative with said second member for providing an output signal in accordance with said second position, a third control device responsive to said output signal and operatively connected to one of said workpiece positioning members for positioning said one member to a predetermined position substantially corresponding to said second position, and a position difference determining device operatively connected to the other of said workpiece positioning members for positioning said other member to a different position in accordance with a predetermined difference relationship between said predetermined position and said different position.

7. In workpiece control apparatus operative with first and second workpiece positioning devices for positioning a workpiece, the combination of position sequence control device for sequencing the changes of position of said workpiece, a first control device responsive to said sequence control device and operative with said first workpiece positioning device for providing a first control signal for positioning initially said first workpiece positioning device to a first predetermined position, a second control device responsive to said sequence control device and operative with said second positioning device for providing a second control signal for positioning initially said second workpiece positioning device to a second position and in accordance with a predetermined relationship to said first predetermined postion, a position signal storage device operative with said second member for providing an output signal in accordance with said second position, said sequence control device being operative with said storage device to cause said output signal to position said first member to said second position, position difference determining device for providing a third control signal for positioning said second workpiece positioning device to a third position in accordance with a predetermined relationship between said third position and said second position.

8. In workpiece position control apparatus operative with first and second workpiece position control members for positioning a workpiece, the combination of a first control device operative with said first control member for positioning said first control member to a first predetermined position, a second control device operative with said second control member for positioning said second workpiece control member to a second position, a position difference determining device operative with one of said workpiece control members for positioning said one workpiece control member to a third predetermined position and in accordance with a predetermined relationship to said second position, a position signal storage device operative with the other of said workpiece control members for positioning said other workpiece control member to said second position and in accordance with a predetermined relationship to said third predetermined position, and workpiece position sensing means operative with said positon signal storage device for controlling the positioning of said other control member to said second position.

9. In workpiece position control apparatus operative with a control information storage device and first and second workpiece positioning members for positioning a workpiece having at least a first dimension and a second dimension, the combination of a first control device connected to said first positioning member and operative with said storage device for receiving a first control signal for positioning said first workpiece positioning member to a first predetermined position, a second control device connected to said second positioning member and operative with said storage device for receiving a second control signal for positioning said second workpiece positioning member to a second position and in accordance with said first workpiece dimension relative to said first predetermined position, a position signal storage device connected to one of said workpiece positioning members and operative with the other of said positioning members to provide a third control signal in accordance with the position of said other member for positioning said one workpiece positioning member to a third predetermined position substantially corresponding to the previous position of said other member, and a position difference device operative with the other of said workpiece positioning members and responsive to control signals from said information storage device for providing a fourth control signal to position said other workpiece positioning member to a fourth position.

10. In workpiece control apparatus operative with a position information storage device and left and right workpiece positioning members for controlling the position of a workpiece, the combination of a first control device operatively connected to said left positioning member and operative with said storage device for receiving a first control signal from said storage device for positioning said left workpiece positioning member to a first predetermined position, a second control device operatively connected to said right positioning member and operative with said storage device for receiving a second control signal from said storage device for positioning said right workpiece positioning member to a second predetermined position and in accordance with a predetermined relationship to said first predetermined position, a position signal storage device operative with one of said left and right members for storing a position signal in accordance with the position of said one member, with said control device for the other of said left and right members being responsive to said position signal for positioning said other workpiece positioning member to a third predetermined position in accordance with a predetermined relationship to the position of said one member, and a position difference determining device responsive to control signals from said information storage device and operatively connected to said one workpiece positioning member for positioning said one workpiece positioning member to a fourth position in accordance with a predetermined difference relationship to said third position.

11. In workpiece control apparatus operative with a position information storage device and left and right workpiece positioning members for controlling the position of a workpiece, the combination of an operation sequencing control device, a first control device responsive to a signal from said sequencing device and operatively connected to said right positioning member and operative with said storage device for receiving a first control signal from said storage device for positioning said right workpiece positioning member to a first predetermined position, a second control device responsive to a signal from said sequencing device and operatively connected to said left positioning member and operative with said storage device for receiving a second control signal from said storage device for positioning said left workpiece positioning member to a second predetermined position and in accordance with a predetermined relationship to said first predetermined position, a control signal storage device operatively connected to receive one of said first and second control signals for positioning one of said left and right workpiece positioning members to a predetermined position in accordance with a predetermined relationship to one of said first and second positions, and a control signal difference determining device operatively connected to receive said one control signal and at least an additional control signal from said information storage device for positioning the other of said workpiece positioning members to an additional predetermined position in accordance with a predetermined difference relationship to the position of said one workpiece positioning member.

12. In a workpiece position control apparatus operative with first and second workpiece positioning members for positioning a workpiece, the combination of a first control device connected to said first member for positioning said first workpiece member to a first predetermined position, a second control device connected to said second member for positioning said second member to a second position, a position storage device connected to one of said workpiece positioning members for providing a control signal in accordance with the position of said one member for positioning the other of said members, and a position difference determining device responsive to said control signal for positioning said one member to a predetermined position in accordance with a desired position difference relationship to the position of said other member.

13. In workpiece position control apparatus operative with left and right workpiece position control members for positioning a workpiece, the combination of a first control device operative with said left control member for initially positioning said left control member to a first predetermined position, a second control device operative with said right control member for initially positioning said right workpiece control member to a second position, a position information storage device operative with one of said workpiece control members for storing a control signal corresponding to the initial position of said one member and operative to position subsequently said other control member in accordance with said control signal, and a position difference determining device operative with said one workpiece control member for positioning said one workpiece control member to a different position in accordance with a predetermined difference relationship to the subsequent position of said other control member.

No references cited.